(12) United States Patent
Proscia et al.

(10) Patent No.: US 11,588,925 B2
(45) Date of Patent: Feb. 21, 2023

(54) METHOD FOR TRANSFERRING LARGE AMOUNTS OF DATA THROUGH A TELEMATIC NETWORK IN AN EFFICIENT AND RELIABLE MANNER AT A HIGH-SPEED

(71) Applicant: MAINSTREAMING S.p.A., Milan (IT)

(72) Inventors: Giovanni Proscia, Milan (IT); Antonio Gregorio Corrado, Milan (IT); Philippe Ange Michel Tripodi, Milan (IT); Sergio Ambrogio Bruno Carulli, Milan (IT)

(73) Assignee: MAINSTREAMING S.p.A., Milan (IT)

( * ) Notice: Subject to any disclaimer, the term of this patent is extended or adjusted under 35 U.S.C. 154(b) by 113 days.

(21) Appl. No.: 17/101,481

(22) Filed: Nov. 23, 2020

(65) Prior Publication Data

US 2021/0160348 A1 May 27, 2021

(30) Foreign Application Priority Data

Nov. 26, 2019 (IT) ...................... 1020190000022185

(51) Int. Cl.
*H04L 69/16* (2022.01)
*H04L 1/00* (2006.01)
*H04L 69/166* (2022.01)

(52) U.S. Cl.
CPC .......... *H04L 69/161* (2013.01); *H04L 1/0076* (2013.01); *H04L 69/166* (2013.01); *H04L 2212/00* (2013.01)

(58) Field of Classification Search
CPC ... H04L 69/161; H04L 1/0076; H04L 69/166; H04L 2212/00; H04L 67/06; H04L 67/2804; H04L 69/164
See application file for complete search history.

(56) References Cited

U.S. PATENT DOCUMENTS 6,438,105 B1 *  8/2002  Qarni ........................ H04L 1/18
                                                    358/425
7,817,631 B1 * 10/2010  Qian ..................... H04L 69/164
                                                    370/392

(Continued)

*Primary Examiner* — Tejis Daya
(74) *Attorney, Agent, or Firm* — Dickinson Wright PLLC; Andrew D. Dorisio

(57) ABSTRACT

The method is for the transfer of data of a message subdivided in fragments from a first intermediary electronic processing unit (43) to a second intermediary electronic processing unit (45); before the transfer, the first unit (43) receives the data encapsulated in the payload of data packets of the TCP type from a sender electronic processing unit (41) and decapsulates them; after the transfer, the second unit (45) encapsulates data in the payload of data packets of the TCP type and transmits them to a recipient electronic processing unit (47); the transfer takes place by means of data packets of the UDP type; the first unit (43) also inserts in the payload (32) of UDP packets; a first data field (C1) containing an identifier of a connection between the sender unit (41) and the recipient unit (47), a second data field (C2) containing an identifier of the message to be transferred, and a third data field (C3) containing a number that identifies the position of a fragment within the message to be transferred.

16 Claims, 3 Drawing Sheets

(56) References Cited

U.S. PATENT DOCUMENTS

Figure 1:
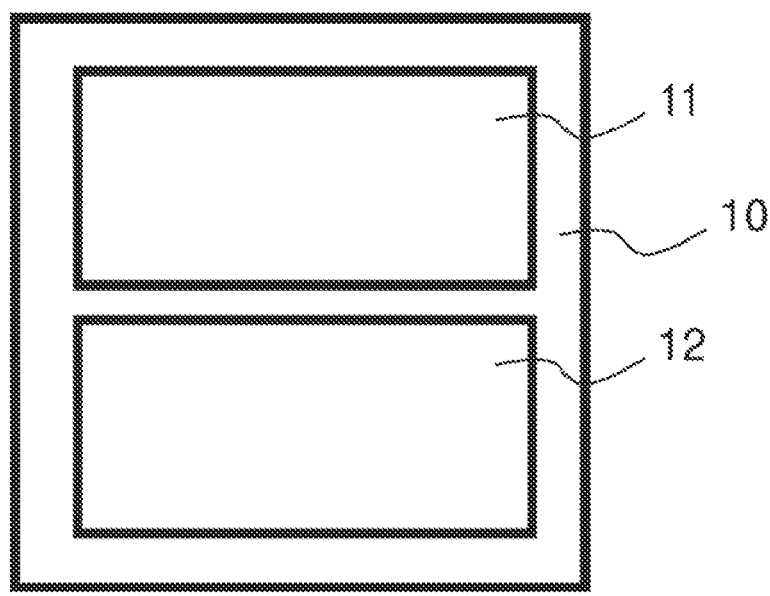

| | | | |
|---|---|---|---|
| 2001/0009554 A1* | 7/2001 | Katseff | H04L 69/165 |
| | | | 370/466 |
| 2001/0048787 A1* | 12/2001 | Conemac | H04J 14/02 |
| | | | 385/24 |
| 2003/0161312 A1* | 8/2003 | Brown | H04L 69/161 |
| | | | 370/392 |
| 2004/0264441 A1* | 12/2004 | Jalkanen | H04L 1/1607 |
| | | | 370/428 |
| 2005/0025185 A1* | 2/2005 | Brown | H04L 47/36 |
| | | | 370/465 |
| 2005/0249237 A1 | 11/2005 | Fuchs et al. | |
| 2010/0214986 A1* | 8/2010 | Agiwal | H04W 80/04 |
| | | | 370/328 |
| 2015/0071067 A1* | 3/2015 | Martin | H04L 47/34 |
| | | | 370/235 |
| 2020/0014486 A1* | 1/2020 | Harrang | H04L 1/1671 |

\* cited by examiner

METHOD FOR TRANSFERRING LARGE AMOUNTS OF DATA THROUGH A TELEMATIC NETWORK IN AN EFFICIENT AND RELIABLE MANNER AT A HIGH-SPEED

FIELD OF THE INVENTION

The present invention relates to a data packet for transport-level communication protocol between two intermediary electronic processing units (which do not correspond to the data initial sender and final recipient), a method for transferring data through a telematic network based on such data packet, as well as a related program for computer and a related computer.

STATE OF THE ART

Telematic networks are used to transfer data between "users" more precisely between electronic processing units of "users", such as phones and computers, in particular between the electrical components of such apparatuses; "users" act as suppliers (initial senders) and/or consumers (final recipients) of information.

Presently the most widespread telematic networks are "packet networks", i.e. networks wherein data are subdivided in data packets before being transmitted.

As known, the presently most widespread network is the Internet.

The amount of data that users need to transfer to other users increases continuously: several years ago it was measured in Kbytes, then in Mbytes and presently in Gbytes and sometimes even in Tbytes. Typically, data to be transferred are grouped in so-called "files".

Users can be physical persons or companies or computer applications running on an electronic processing unit. There are users who typically transmit data, users who typically receive data, and users doing both things.

Packets of the TCP type (=Transmission Control Protocol) are used to transfer data in a reliable manner through the Internet. This protocol is extremely reliable, however inefficient; in fact, for each block of bits of data to be transferred (corresponding to the "payload" of the data packet of the TCP type) there are 160 bits of data to be added (corresponding to the "header" of the data packet of the TCP type) to allow for a reliable transfer. Furthermore, this protocol provides the use of a window for retransmissions, indicated with the acronym RWIN (TCP Receive WINdow); i.e., in case a data packet is not received the whole window must be retransmitted and not only the non-received data packet; this is an additional cause of inefficiency, if not the main cause of inefficiency.

The Internet also provides another type of data packet, i.e. the data packet of the UDP type. This protocol is far more efficient, however it is not reliable, in other words it is not possible to be sure: 1) that a data packet sent has actually been received, 2) what the logical order of the data packets received is (in fact, typically the order of reception is different from the transmission order or from the logical order), 3) of correction of the transport errors (in fact, in the path from the sender to the recipient data may change for instance due to noise and therefore data received may be slightly different from data transmitted).

U.S. Pat. No. 7,817,631 provides using data packets of the UDP type for transferring data among users, specifically from an initial sender to a final recipient; the protocol according to this patent provides that additional information is inserted in the payloads of the data packets of the UDP type. This solution requires the new protocol to be implemented in all the electronic processing units of the (final) users who intend to benefit from it, both as for transmission and reception. Therefore, this solution is not transparent to users, or better to their apparatuses (phones, computers, etcetera), and, for instance, cannot be immediately used or easily applied for those who work in the content provision business as it requires clients to update the reception and content processing software of their user apparatuses and requires the content provider to distinguish between clients having the old software and clients having the new software and thus to send contents in two different modes.

The object of the invention is to overcome the drawbacks of the prior art, in particular to allow for the transfer of large amounts of data in a reasonably efficient and reliable manner.

ABSTRACT

The Applicant focused in particular on the transfer of video files and numerical calculus files, considering transfers of files with a size in the order of 100 Mbytes or 1 Gbyte or 10 Gbytes.

The Applicant focused in particular on the transfer of files through the Internet wherein the apparatus of the user initially sending data, or "sender apparatus" and the apparatus of the user finally receiving data, or "recipient apparatus" are connected to the Internet.

Such object is reached by the technical solution set forth in the enclosed claims which form an integral part of the present description.

It must be noted that the present invention does not require the use (and thus the prior installation) of specific physical connections between nodes of the telematic network.

The idea underlying the present invention is to use intermediary electronic processing units (that may be called "acceleration servers") and to use data packets of the UDP type for transferring data between the two intermediary electronic processing units, but with additional data fields to manage reception confirmation, logical order and possible errors; such additional data fields form the "header" of the data packet of the new type and add to the native "header" of the data packet of the UDP type; instead, to transfer data between a "sender apparatus" and a first intermediary electronic processing unit and to transfer data between a second intermediary electronic processing unit and a "recipient apparatus" data packets of the standard TCP type are used.

Such a data packet of the new type is considered and managed by the Internet network as a normal data packet of the UDP type by the normal network nodes (i.e. not provided with a specific application). The additional functionalities may be managed at an application level by the particular sender network node (provided with a specific application) sending such data packets and by the particular recipient network node (provided with a specific application) receiving such data packets.

Figure 5:
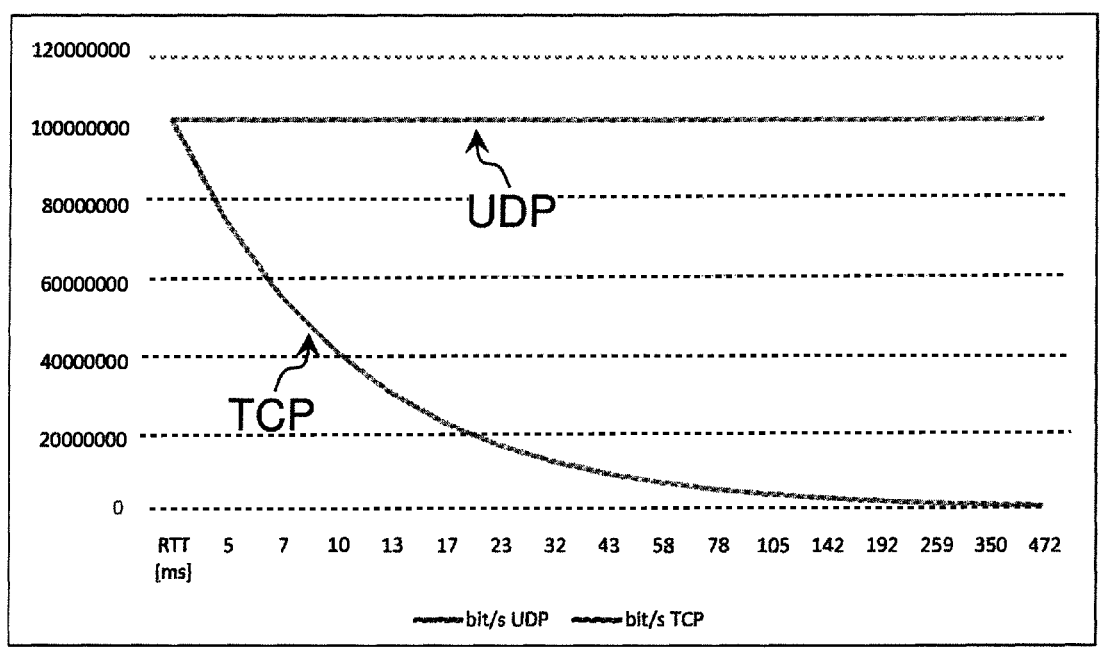

In FIG. 5, a comparison between the throughput of the TCP and UDP protocols expressed in bit/s and the RTT (=Round Trip Time) expressed in ms is shown; it must be noted that the throughput does not depend on the RTT for UDP protocol while it is severely penalised by the RTT in case of TCP protocol. Therefore, among other things, there is a great advantage in using the UDP protocol on the Internet (either with IPv4 protocol or Ipv6 protocol) especially in case of long distance transmissions wherein the RTT tends to reduce remarkably.

LIST OF FIGURES

Figure 2:
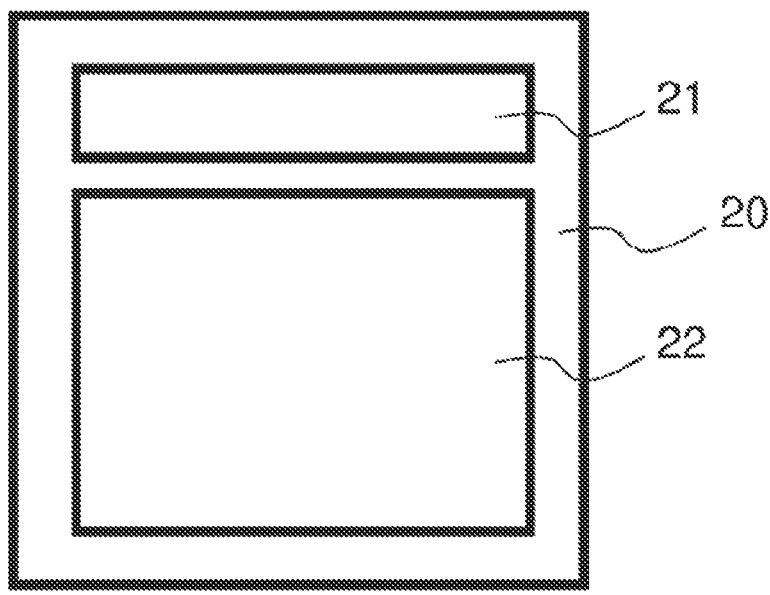
Figure 3:
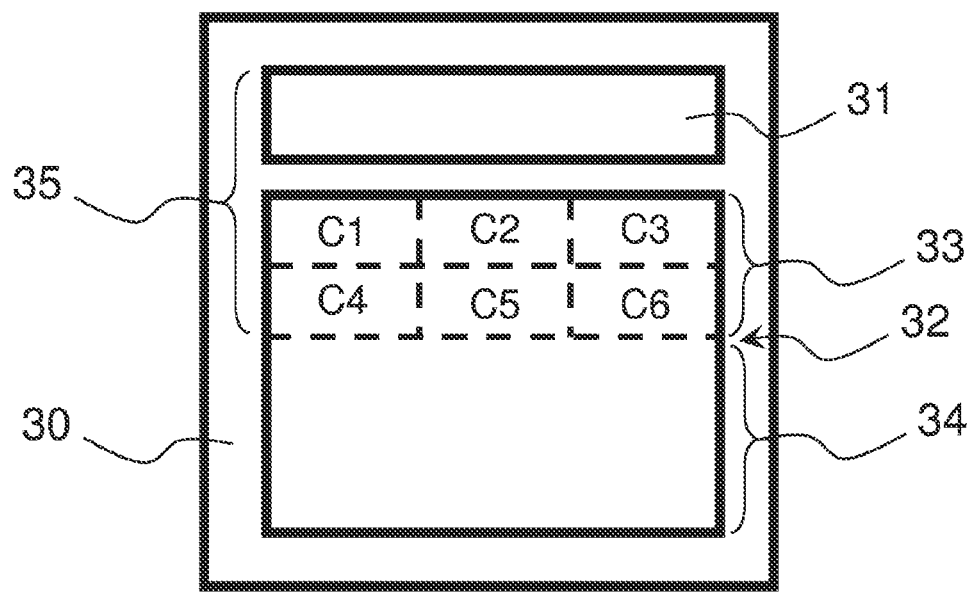
Figure 4:
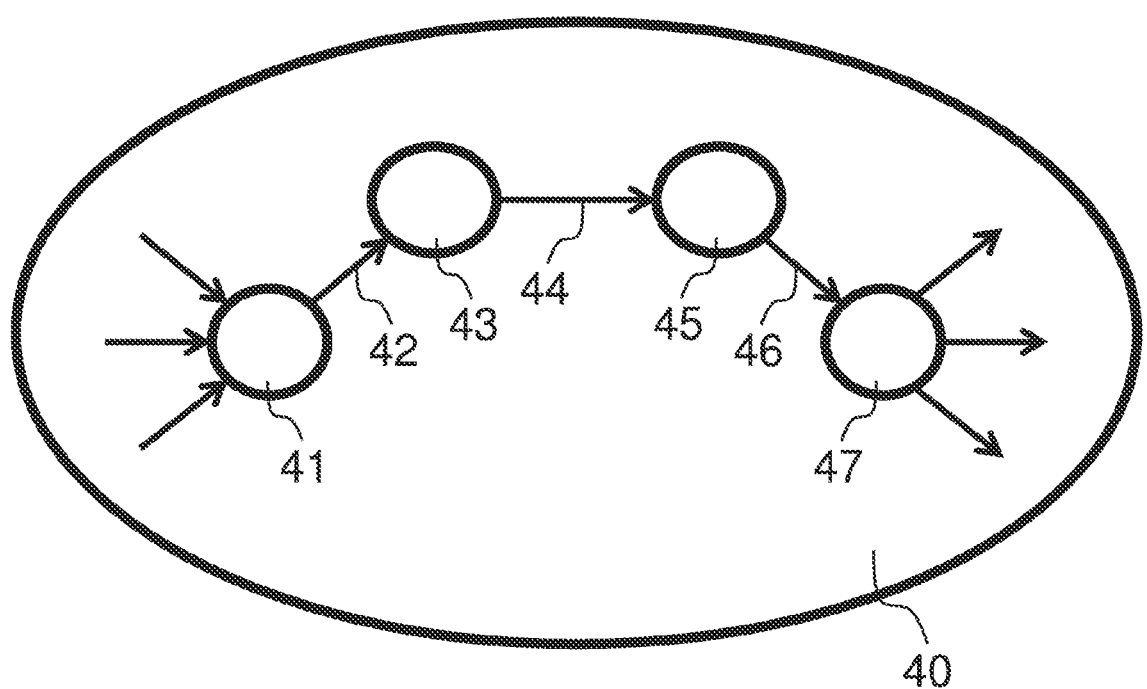

The present invention shall become more readily apparent from the detailed description that follows to be considered together with the accompanying drawings in which:

FIG. 1 schematically shows a data packet of the TCP type,

FIG. 2 schematically shows a data packet of the UDP type,

FIG. 3 schematically shows a data packet according to the present invention, FIG. 4 shows a diagram of data transfer on the Internet based on the method according to the present invention, and FIG. 5 shows a comparison between the throughput of TCP and UDP protocols.

As it can be easily understood, there are various ways of practically implementing the present invention which is defined in its main advantageous aspects in the appended claims and is not limited either to the following detailed description or to the appended claims.

DETAILED DESCRIPTION

In FIG. 1 a data packet 10 of the TCP type is shown schematically; a "header" 11 and a "payload" 12 can be seen. As already said, for each block of bits of (information) data to be transferred in the "payload" 12 there are 160 bits of (service) data in the "header" 11.

In FIG. 2 a data packet 20 of the UDP type is shown schematically; a "header" 21 and a "payload" 22 can be seen. In the "header" 21 there are 32 bits while in the "payload" 22 there are a minimum of 8 bits (that is 1 byte) to a theoretical maximum of 524,288 bits (that is 65,536 bytes), even if typically it is difficult to go over 9000 Bytes. It is thus clear that data transmission by means of data packets of the UDP type may be very efficient, though at the price of accepting a low or very low reliability. As previously explained, the greater efficiency of the UDP protocol is also related to the fact that RWIN is not used.

The reliability issue may be overcome by using physical connections that are particularly reliable for data transmission.

Such solution is obviously expensive.

The idea underlying the present invention is to use data packets of the UDP type for transferring data between two "intermediary electronic processing units", but with additional data fields to manage reception confirmation, logical order and possible errors; such additional data fields constitute the "header" of the data packet of the new type and add to the native "header" of the data packet of the UDP type. In FIG. 3 a data packet 30 according to the present invention is shown. The data packet 30 is as such a data packet of the UDP type like pack 20; its "header" 31 corresponds to the "header" 21; there is also a "payload" 32 similar to the "payload" 22. However, a first part, indicated in figure by 33, of the "payload" 32 is occupied by data fields, specifically six data fields C1-C6, which have a content of the "header" type, and a second part, indicated in figure by 34, of the "payload" 32 constitutes the real "payload" of the packet 30; the real "header" of the packet 30 that is indicated by 35 in the figure is constituted by 31 and 33 together.

It is a communication protocol data packet that is conceptually at transport level, like the data packet of the TCP type and the data packet of the UDP type.

In the example of FIG. 3, six data fields C1-C6 are shown, but, as will be hereinafter clear, according to the present invention a smaller number of data fields may be sufficient, and it is not excluded a higher number of data fields.

In the example of FIG. 3, data fields C1-C6 are shown as being consecutive, however, as will be clear hereinafter, they may be distributed in a different way inside the "payload" 32. For example, it is perfectly possible or even preferable that one of these, in particular the data field C6 is positioned at the end of the "payload" 32.

Generally, the data packet according to the present invention consists of a header section (indicated by 35 in the example of FIG. 3) and a payload section (indicated by 34 in the example of FIG. 3). The payload section 34 varies in length and contains a fragment of a message to be transferred from a sender (the "initial" sender that is the content provider—for example indicated by 41 in FIG. 4) to a recipient (the final recipient that is the content user—for example indicated by 47 in FIG. 4); for instance, it may be a fragment of a video file or a numerical calculus file. It must be noted that neither the sender nor the recipient corresponds with one of the two "intermediary electronic processing units".

The length of the payload section (indicated by 34 in the example of FIG. 3) of the data packet according to the present invention may typically be 1,000 to 10,000 byte long.

The header section (indicated by 35 in the example of FIG. 3) comprises a header (indicated by 31 in the example of FIG. 3) of a data packet of the UDP type and also:

a first data field (indicated by C1 in the example of FIG. 3) (which may be called "Flow-ID") containing an identifier of a connection (or "data flow" as mentioned by the name of the field) between the sender and recipient used to transfer the message—in other words, this data field takes also into consideration the fact that the transmission between intermediaries is for supporting a data transfer (of a "data flow") between sender and recipient that are respectively upstream and downstream of the intermediaries, a second data field (indicated by C2 in the example of FIG. 3) (which may be called "Chunk-ID") containing an identifier of the message, a third data field (indicated by C3 in the example of FIG. 3) (which may be called "Sequence") containing a number identifying the position of the fragment within the message in terms of number of fragments preceding the fragment in the message.

The header section of the data packet of the UDP type (indicated by 31 in the example of FIG. 3) is a standard one; in particular, the source port field may contain an identifier associated to the sender and the recipient port field may contain an identifier associated to the recipient.

The payload section (indicated by 34 in the example of FIG. 3) contains a fragment of a message to be transferred from a first intermediary electronic unit (for example indicated by 43 in FIG. 4) to a second intermediary electronic processing unit (for example indicated by 45 in FIG. 4); such a message comes from the sender (for example indicated by 41 in FIG. 4) and goes to the recipient (for example indicated by 47 in FIG. 4).

Such a data packet of the new type may be considered and managed by the Internet network as a normal data packet of the UDP type, thanks to its UDP "header".

Therefore, this data packet may be used to transfer data with no modification to the Internet network; it is sufficient that the intermediary electronic processing units (though not the sender or the recipient) are provided with a suitable application adapted to manage it, i.e. manage (both in reception and in transmission) at least three data fields C1 and C2 and C3 present in the UDP "payload".

The header section (indicated by 35 in the example of FIG. 3) may also comprise:
- a fourth data field (indicated by C4 in the example of FIG. 3) (which may be called "Datagram-Type) containing an identifier to classify the content of the payload section, in particular if it contains a fragment of a message.

The fourth data field is particularly useful in case the data packet according to the present invention is used to transport not only "applicative data", but also "control data", i.e. in other words, if a data packet according to the present invention may in some cases be a "control packet" or a "control data packet". It must be noted that, as will be clearer hereinafter, the present invention does not exclude using data packets of the UDP type, or better "enhanced UDP", and data packets of the TCP type for the same communication between intermediary electronic processing units. It must be specified that, in the present description, the expression "data packet of the enhanced UDP type" means a data packet according to the present invention (with all its possible variants) which can be considered and managed as a data packet of the UDP type as it is provided with a UDP header.

The header section (indicated by 35 in the example of FIG. 3) may also comprise:
- a fifth data field (indicated by C5 in the example of FIG. 3) (which can be called "Start-Byte") containing a number identifying the position of the fragment inside the message in terms of byte distance from the beginning of the message.

The fifth data field is useful for retransmitting data packets that were lost or received with data highly corrupted by errors, in particular if (as it often occurs on the Internet) the MTU (=Maximum Transmission Unit) length varies during the transmission of the message subdivided in a plurality of fragments. If this data field contained all zeros, it might for example indicate that the data packet does not refer to a retransmission of a fragment of a message.

The header section (indicated by 35 in the example of FIG. 3) may also comprise:
- a sixth data field (indicated by C6 in the example of FIG. 3) (which may be called "ECC") containing information to identify and/or correct errors (for example transport errors) in the payload section.

The sixth data field is particularly useful if the transmission means (or more than transmission means) along the path between the two intermediary electronic processing units is noisy and/or if the application is sensitive to errors.

The sixth data field is preferably at the end of the payload section 32.

In terms of size:
- the first data field (C1 or "Flow-ID") may typically have a length of 4 to 12 bits,
- the second data field (C2 or "Chunk-ID") may typically have a length of 8 to 16 bits,
- the third data field (C3 or "Sequence") may typically have a length of 16 to 32 bits,
- the fourth data field (C4 or "Datagram-Type"), if present, may typically have a length of 4 to 8 bits,
- the fifth data field (C5 or "Start-Byte"), if present, may typically have a length of 32 to 64 bits,
- the sixth data field (C6 or "Datagram-Type"), if present, may typically have a length of 8 to 32 bits.

In FIG. 4, a situation is exemplified to illustrate the method according to the present invention; this situation is not to be considered as limiting the present invention. Reference 40 corresponds to the Internet. Within the network 40 four network nodes are highlighted, respectively associated to references 41, 43, 45 and 47. These network nodes are electronic processing units; for instance, the node 41, "initial" sender, may be a server of a provider adapted to store and provide videos to clients of a service based on their needs, the nodes 43 and 45 may be telecommunication apparatuses adapted to speed up video transfers from the provider to its clients (that can be called "acceleration servers"), the node 47, "final destination", may be a cell phone or a portable computer of a client adapted to receive and display videos.

References 42, 44 and 46 respectively indicate connections between nodes 41 and 43, nodes 43 and 45 and nodes 45 and 47. They are logical and non-physical connections, i.e. data packets transmitted from the node 41 or 43 or 45 and respectively received form the node 43 or 45 or 47 can follow different paths within the Internet.

It must be made clear that the time range in which the connection 42 is active is not necessary overlapping the time range in which the connection 44 is active and that the time range in which the connection 44 is active is not necessarily overlapping the time range in which the connection 46 is active. Said otherwise, a video file may be entirely transferred from node 41 to node 43, and later (and independently) the same video file may be transferred from node 43 to node 45, still later (and independently) the same video file may be transferred from node 45 to node 47. Furthermore, this video file may also be kept entirely stored for a given time range (even long) in the node 43 and/or node 45; in fact, subsequently the node 43 may want or have to transfer this video file to a different node 45, and/or subsequently the node 45 may want or have to transfer this video file to a node other than node 47.

Finally, this video file may also be kept entirely stored for a given time range (even long) in the node 41 and/or node 47. In fact, the node 41 and/or node 47 may also be, for instance, servers of a service provider of video distribution or third party servers; in this case the connection 42 and/or the connection 46 may be, for instance, "internal" connections of an Ethernet and not "external" connections of the Internet. The main aim of the method according to the present invention which will be hereinafter illustrated is the transfer of this video file from the node 43, generally called "first electronic processing unit", to the node 45, also generally called "second electronic processing unit", by means of a telematic network, in particular the Internet.

However it must be considered that:
before such transfer, the first intermediary electronic processing unit receives file data encapsulated in the payload of the data packets of the TCP type from a sender electronic processing unit (41 in FIG. 4) through a telematic network (40 in FIG. 4), in particular the Internet, and decapsulates them, and after such transfer, the second intermediary electronic processing unit encapsulates the file data in the payload of the data packets of the TCP type and transmits them to a recipient electronic processing unit (47 in FIG. 4) through a telematic network (40 in FIG. 4), in particular the Internet;

hence, the method according to the present invention is basically for transferring this video file from the node 41 to the node 47.

For the purposes of the present invention, no restrictions are assumed about the size of the payloads of data packets of the TCP type being transferred between nodes 41 and 43, of data packets of the UDP type being transferred between nodes 43 and 45, of data packets of the TCP type being transferred between nodes 45 and 47.

Let us assume (with non-limiting reference to FIG. 3 and FIG. 4) that:

- it is required to transfer data from a first electronic processing unit 43 to a second electronic processing unit 45,
- the first and second units 43 and 45 are connected by means of a telematic network 40, in particular the Internet,
- the data transfer from the first unit 43 to the second unit 45 takes place by transmission and reception of data packets of the UDP type.

For the purposes of the present invention, the most typical instance is that data to be transferred are not generated and used directly from the node 43 and node 45 respectively; in fact, they serve as "facilitators" of the data transfer from node 41 to node 47. However, it must not be excluded that in some applicative scenarios the "real sender" is the node 43 and/or the "real recipient" is the node 45.

In the above assumptions, nodes 41 and 47 may have available traditional applications (for instance video applications) adapted to transmit and receive data packets of the TCP type; the "TCP->UDP conversion" and the "UDP->TCP conversion" takes place respectively in the nodes 43 and 45.

Before starting transferring data from the node 43 to the node 45 it is required to establish a (logical) connection between them, and, typically, store totally or partially a data file to be transmitted in the node 43; subdividing this file into fragments may be done before starting the transmission, or may be done and/or proceed during the transmission, especially if the file is a large size one. The existence of a data file in the node 43 to be sent to the node 45 (and possibly its overall size) may be pre-signalled from the node 43 to the node 45, though not necessarily.

According to the method of the present invention, the first unit 43 inserts in the payload of data packets of the UDP type:

- a first data field (indicated by C1 in the example of FIG. 3) (which can be called "Flow-ID") containing an identifier of the connection between the sender, in particular the node 41, and the recipient, in particular the node 47, used to transfer the message, in particular the data file to be transferred,
- a second data field (indicated by C2 in the example of FIG. 3) (which may be called "Chunk-ID") containing an identifier of the message to be transferred,
- a third data field (indicated by C3 in the example of FIG. 3) (which can be called "Sequence") containing a number identifying the position of the fragment transported from the data packet inside the message to be transferred in terms of number of fragments preceding the fragment in the message.

Obviously, as previously described, the first unit 43 must insert data into the header section 31 (which is a UDP header) of each data packet to be transmitted and must insert data into the payload section 34 (which is a payload with a smaller size than the UDP standard payload) of each data packet to be transmitted.

Once the data packet to be transmitted is completely filled with data, it is transmitted from the first unit 43 to the second unit 45.

What just described only refers to data packets intended to transport fragments of the message, i.e. of the data file to be transferred. There will also be "control packets" of the UDP type, or better "enhanced UDP" (i.e. according to the present invention) and/or of the TCP type exchanged between the first unit 43 and the second unit 45.

The second unit 45 that receives such data packets may use these three data fields to properly reconstruct a message (typically many different messages associated to one or more connections), in particular a data file, properly assembling the various fragments of message received.

Furthermore, the second unit 45 may determine the lack of some fragments (presumably consequent to the lack of some data packets) and, accordingly, require retransmission to the first unit 43.

As previously explained, the data packets of the UDP type transmitted from the first unit 43 to the second unit 45 may also contain other data fields in particular for the previously described purposes.

Thus, according to the method of the present invention, the first unit 43 can insert data of the UDP type in the payload packets of:

- a fourth data field (indicated by C4 in the example of FIG. 3) (which may be called "Datagram-Type) containing an identifier to classify the content of the payload section, in particular if it contains a fragment of a message, and/or

- a fifth data field (indicated by C5 in the example of FIG. 3) (which can be called "Start-Byte) containing a number identifying the position of the fragment inside the message in terms of byte distance from the beginning of the message.

and/or

- a sixth data field (indicated by C6 in the example of FIG. 3) (which may be called "ECC") containing information to identify and/or correct errors (for example transport errors) in the payload section.

In order to reach a high efficiency of data transfer between the units 43 and 45, it is advantageous that the first unit 43 transmits data packets equal or slightly smaller than the maximum MTU size supported by the telematic network 40 between the first unit 43 and the second unit 45. For this purpose, the first unit 43 may repeatedly transmit to the second unit 45 specific data packets of the UDP or TCP type adapted to determine the maximum MTU size that the telematic network 40 supports in the connection between the first unit 43 and the second unit 45; once this size is determined, the first unit can set accordingly the length of the data packets of the UDP type used to transfer data towards the second unit 45. It must be noted that this size may vary over time; this is why, preferably, these specific data packets are repeatedly transmitted so that the first unit 43 can continuously adapt its operation. Advantageously, the specific data packets adapted to determine the maximum MTU size are of the TCP type. In this case, a timeout (or "time limit") is set by the first unit 43 to manage these specific data packets called "TestMTU"; in particular, the first unit 43 transmits to the second unit 45 a TestMTU packet of a given size, if the unit 45 confirms to the unit 43 the reception of this packet before the timeout expires, the unit 43 transmits a TestMTU packet of greater size and this is repeated until the unit 43 no longer receives confirmation within the timeout; at this point, the unit 43 assumes that the MTU size substantially corresponds to the size of the last TestMTU packet confirmed by the unit 45. The timeout can be determined (by the first unit 43) by means of a "ping-pong" mechanism of data packets (for example called "Ping" and "Pong" and of the UDP type, or better "enhanced UDP", i.e. according to the present invention) between the first unit 43 and the second unit 45 (specifically "ping-pong" allows to determine a "latency time" and then a "variability range" can be applied).

Advantageously, the data transfer from the first unit 43 to the second unit 45 can take place by means of transmission and reception of data packets of the UDP type, or better "enhanced UDP" (i.e. according to the present invention), setting the "DF" flag of the header of the Ipv4 packet to the value corresponding to "non-fragmentation". Thereby, in case, at a given time, the size of the "big" data packet is greater than any MTU along the connection, the telematic network 40 will not make any attempt to break a "big" data packet into two "small" data packets; thus, no performance degradation will take place, i.e. of the efficiency in data transfer and use of the network infrastructure.

As already said, typically and advantageously, the data transfer from the first unit 43 to the second unit 45 can provide retransmitting from the first unit 43 data not received by the second unit 45, or received as highly corrupted by errors.

It must be noted that failure to receive data by the second unit 45 can be determined based on one or more criteria, for instance and typically exceeding or not a timeout (or "time limit").

The method according to the present invention can be implemented by means of a specific hardware and/or a specific software installed for example on a "first transmitting intermediary electronic processor" and on a "second receiving intermediary electronic processor".

It must be noted that the usual communication symmetry makes it typical for such hardware and/or software to be identical or similar on both processors; thus, the "transmitting" and "receiving" attributes may apply for both the processors at different moments according to the operative step.

If we consider the "transmitting" attribute, such hardware and/or such software can not only deal with the preparation (including encapsulation) and transmission of data packets of the UDP type, but also with the reception and processing (including decapsulation) of data packets of the TCP type, always in relation to a message to be transferred subdivided into fragments; the subdivision into fragments may be different between TCP packets received and UDP packets transmitted.

If we consider the "receiving" attribute, such hardware and/or such software can not only deal with processing (including decapsulation) data packets of the UDP type, but also with the preparation (including encapsulation) and transmission of data packets of the TCP type, always in relation to a message to be transferred subdivided in fragments; the subdivision into fragments may be different between TCP packets transmitted and UDP packets received.

If the method according to the present invention was implemented only in the software, a specific program may be identified in these processors that is stored on a memory support which, when executed by the electronic processor, implements the method according to the present invention, as limited to the transmission aspect, from an intermediary unit to the other or as limited to the reception aspect from an intermediary unit to the other; obviously, both aspects may be conceived.

An electronic processor configured as above described may be called "acceleration server" as it allows to reach a very rapid data transfer, i.e. far more rapid than what could be obtained between two nodes of the Internet with data packets of the TCP type.

The inventions claimed is:

1. Method for the transfer of data of a message subdivided in fragments from a first intermediary electronic processing unit to a second intermediary electronic processing unit, wherein before the transfer, said first intermediary electronic processing unit receives said data encapsulated in the payload of data packets of the TCP type from a sender electronic processing unit through a telematic network being the Internet, and decapsulates them;

wherein after the transfer, said second intermediary electronic processing unit encapsulates said data in the payload of data packets of the TCP type and transmit them to a recipient electronic processing unit through a telematic network, in particular the Internet;

wherein the transfer from said first intermediary electronic processing unit to said second intermediary electronic processing unit takes place by means of transmission and reception of data packets of the UDP type through a telematic network, in particular the Internet, said data being encapsulated in the payload of said data packets of the UDP type;

wherein said first intermediary electronic processing unit further inserts in the payload of said data packets of the UDP type:

a first data field containing an identifier of a connection between said sender electronic processing unit and said recipient electronic processing unit used to transfer said message a second data field containing an identifier of said message a third data field containing a number that identifies the position of a fragment within said message in terms of the number of fragments preceding said fragment in said message.

2. Method for transferring data according to claim 1, wherein said first intermediary electronic processing unit inserts in the header of said data packets of the UDP type:

in the source port field of the header of said data packets of the UDP type an identifier associated to said sender electronic processing unit, and in the recipient port field of the header of said data packets of the UDP type an identifier associated to said recipient electronic processing unit.

3. Method for transferring data according to claim 1, wherein said first intermediary electronic processing unit also inserts in the payload of said data packets of the UDP type:

a fourth data field containing an identifier to qualify the content of said payload section, in particular if said payload section contains a fragment of a message.

4. Method for transferring data according to claim 1, wherein said first intermediary electronic processing unit also inserts in the payload of said data packets of the UDP type:

a fifth data field containing a number that identifies the position of said fragment within said message in terms of distance in bytes from the beginning of the message.

5. Method for transferring data according to claim 1, wherein said first intermediary electronic processing unit also inserts in the payload of said data packets of the UDP type:

a sixth data field containing information to identify and/or correct errors in said payload section wherein said sixth data field is preferably at the end of the payload section.

6. Method for transferring data according to claim 1, wherein said first intermediary electronic processing unit repeatedly transmits to said second intermediary electronic processing unit specific data packets of the UDP or TCP type adapted to determine the maximum MTU size that said telematic network supports in the connection between said first intermediary electronic processing unit and said second intermediary electronic processing unit, and wherein said first intermediary electronic processing unit accordingly sets the length of the data packets of the UDP type used for said data transfer.

7. Method for transferring data according to claim 6, wherein said first intermediary electronic processing unit repeatedly transmits to said second intermediary electronic processing unit specific data packets of the TCP type adapted to determine the maximum MTU size that said telematic network supports, wherein a timeout is set to manage said specific data packets, said timeout is determined by means of a "ping-pong" mechanism between said first intermediary electronic processing unit and said second intermediary electronic processing unit.

8. Method for transferring data according to claim 1, wherein the data transfer from said first intermediary electronic processing unit to said second intermediary electronic processing unit takes place by means of transmission and reception of data packets of the UDP type by setting the "DF" flag of the IPv4 packet header to the value corresponding to "non-fragmentation".

9. Method for transferring data according to claim 1, wherein the data transfer from said first intermediary electronic processing unit to said second intermediary electronic processing unit provides for retransmission by said first intermediary electronic processing unit of data not received by said second intermediary electronic processing unit.

10. Method for transferring data according to claim 9, wherein failure to receive data from said second intermediary electronic processing unit is determined based on one or more criteria.

11. Computer program stored on a memory medium which, when executed by a computer, carries out the method according to claim 1 limited to said first intermediary electronic processing unit or to said second intermediary electronic processing unit.

12. Computer comprising hardware and/or software means specifically adapted to carry out the method according to claim 1 limited to said first intermediary electronic processing unit or to said second intermediary electronic processing unit.

13. Data packet for transport-level communication protocol between two intermediary electronic processing units, comprising a header section and a payload section; wherein said payload section is of variable length containing a fragment of a message to be transferred from a sender electronic processing unit to a recipient electronic processing unit; wherein said header section comprises a header of a data packet of the UDP type and furthermore: a first data field containing an identifier of a connection between said sender electronic processing unit and said recipient electronic processing unit used to transfer said message a second data field containing an identifier of said message a third data field containing a number that identifies the position of said fragment within said message in terms of the number of fragments preceding said fragment in said message.

14. The data packet according to claim 13, wherein said header section also comprises: a fourth data field containing an identifier to qualify the content of said payload section, in particular if said payload section contains a fragment of a message.

15. The data packet according to claim 13, wherein said header section also comprises: a fifth data field containing a number that identifies the position of said fragment within said message in terms of distance in bytes from the beginning of the message.

16. The data packet according to claim 13, wherein said header section also comprises:
 a sixth data field containing information to identify and/or correct errors in said payload section
 wherein said sixth data field is preferably at the end of the payload section.

* * * * *